United States Patent [19]

Otake

[11] Patent Number: 5,796,241
[45] Date of Patent: Aug. 18, 1998

[54] SELF-EXCITED OSCILLATION TYPE POWER SUPPLY DEVICE

[75] Inventor: Tetushi Otake, Tsurugashima, Japan

[73] Assignee: Toko, Inc.

[21] Appl. No.: 864,830

[22] Filed: May 29, 1997

[51] Int. Cl.$^6$ .................................................. G05F 1/40
[52] U.S. Cl. .................................................. 323/282
[58] Field of Search .............................. 323/282; 363/97

[56] References Cited

U.S. PATENT DOCUMENTS

| | | | |
|---|---|---|---|
| 4,242,629 | 12/1980 | Shuey | 323/282 |
| 5,389,871 | 2/1995 | Otake | 323/282 |
| 5,523,936 | 6/1996 | Leu et al. | 323/282 |

Primary Examiner—Stuart N. Hecker
Attorney, Agent, or Firm—Londa and Traub LLP

[57] ABSTRACT

A self-excited oscillation type power supply device comprises an auxiliary transistor Q4. When the device is started, a voltage signal providing forward biasis applied to the base of the auxiliary transistor; and when the device is operated, besides the forward bias, at least one of a voltage signal derived from alternate voltage which occurs at a choke coil L1 and a voltage signal corresponding to output voltage, is applied thereto. More specifically, the voltage signal providing forward bias is provided by a resistor R9 connected between the base of the auxiliary transistor Q4 and input terminal 1; the voltage signal derived from the alternate voltage is provided by a capacitor C4 connected between the base of the auxiliary transistor Q4 and one end of a choke coil L1; and the voltage signal corresponding to output voltage is provided by a constant-voltage diode DZ2 connected between the base of the auxiliary transistor Q4 and output terminal 2.

7 Claims, 4 Drawing Sheets

SELF-EXCITED OSCILLATION TYPE POWER SUPPLY DEVICE

BACKGROUND OF THE INVENTION

1. Field of the Invention

The present invention relates to improved techniques for enhancing the versatility and efficiency of a self-excited oscillation type switching supply device.

2. Description of the Prior Art

Switching power supply is classified into two types, i.e., self-excited oscillation type and separately-excited oscillation type, depending on the type of driving system thereof. Switching power supply of the self-excited oscillation type is applied to a relatively low capacitance power source device.

Figure 1:
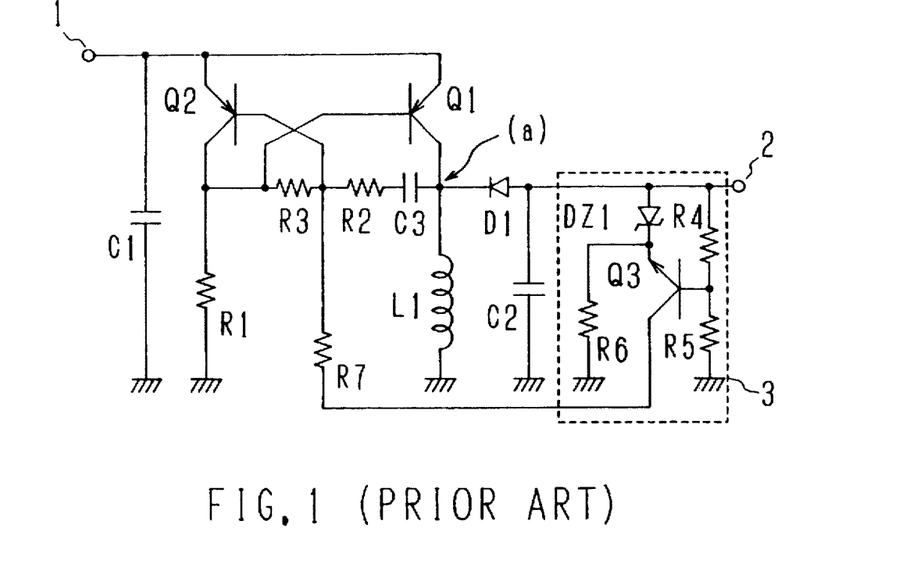
FIG. 1 is a circuit diagram illustrating a conventional self-excited oscillation type switching power supply device.

Among the conventional switching power supply devices of the self-excited oscillation type is one having such a circuit arrangement as shown in FIG. 1 of the accompanying drawings, which operates in such a manner as described just below.

Application of an input voltage $V_{IN}$ to an input terminal 1 causes a current to flow to the base of a first switching transistor Q1 through a resistor R1 so that the first switching transistor Q1 is rendered operative. At this point, a second switching transistor has no sufficient forward bias to enable a second switching transistor Q2 to be turned on applied between the base and the emitter thereof, and thus remains rendered inoperative. The turning-on of first switching transistor Q1 causes a linearly increasing current to flow through a choke coil L1, and at the same time a capacitor C3 is charged in such a manner that a higher potential occurs at the connection point (a) side thereof.

Upper limit value for the collector current (referred to as collector saturation current hereinafter) of the first switching transistor Q1 is determined from the current then flowing through the base thereof. With the circuit arrangement of FIG. 1, the collector saturation current is set up to be substantially constant by means of a resistor R1.

When the level of the current flowing through the choke coil L1 reaches the collector saturation current of the first switching transistor Q1, the current flowing through the choke coil L1 becomes constant so that the potential difference between the terminals of the choke coil L1 becomes nil. Thereupon, the capacitor C3 starts discharging so as to supply base current to turn on the second switching transistor Q2. As a consequence, the base current of the first transistor Q1 decreases and thus the collector current thereof also decreases, so that a flyback voltage is induced in the choke coil L1.

The flyback voltage induced in the choke coil L1 is applied as a forward bias to the second switching transistor Q2 through capacitor C3 and resistor R2 so that the second switching transistor Q2 will be switched to on state. The turning-on of the second switching transistor Q2 causes the base voltage of the first switching transistor Q1 to be increased so that the first switching transistor Q1 will be switched to off state.

While the second switching transistor Q2 remains conductive, a current is permitted to flow from the base of the second switching transistor Q2 through a route defined by the resistor R2, capacitor C3 and choke coil L1 so that the capacitor C3 is charged with a higher potential at the resistor R2 side. As the charging of the capacitor C3 and the decrease in the flyback voltage of the choke coil L1 proceed, the base current of the second switching transistor Q2 is decreased so that the latter will soon be switched to off state. The turning-off of the second switching transistor Q2 causes a current to flow from the base of the first switching transistor Q1 toward to the resistor R1 so that the first switching transistor Q1 will be switched to on state.

Repetition of the above-described operation results in self-excited oscillation.

With the circuit arrangement shown in FIG. 1, output voltage is controlled in such a manner as mentioned just below.

Output voltage occurring at output terminal 2 is divided by means of resistors R4 and R5 in a control circuit 3. Transistor Q3 is arranged such that the amount of current flowing in the collector thereof depends on the difference between the divided voltage applied to the base thereof and the reference voltage of a constant-voltage Zener diode DZ1 which is applied to the emitter thereof. With a variation of the output voltage, the amount of the current flowing in the collector of the transistor Q3 is varied; thus, the base current of the second switching transistor Q2 is varied so that the on duty of the second switching transistor Q2 is varied. The first and second switching transistors Q1 and Q2 constitute a multivibrator in which these two transistors are caused to operate in complementary relationship with each other so that any variation in the on duty of the second switching transistor Q2 will give rise to a variation in the on duty of the first switching transistor Q1. Thus, if the output voltage is varied, then the on duty of the first switching transistor Q1 will be changed so that the circuit arrangement is operable to control to keep constant the output voltage.

Power supply device is normally required to achieve such features as enhanced versatility, low cost, and high efficiency, while being capable of keeping the output voltage in a stabilized state. With the circuit arrangement illustrated in FIG. 1, there still is room for improvement in these respects.

Versatility will first be considered. Lower limit of output voltage which can be derived from the circuit arrangement shown in FIG. 1 turns out to be equal to a voltage ($V_{Z1}$+ $V_{BE3}$) that is a sum of the Zener voltage $V_{Z1}$ of the constant-voltage Zener diode DZ1 and the base-emitter voltage $V_{BE3}$ of the transistor Q3. A commercially available Zener diode element typically represents a Zener voltage higher than 3 V. Thus, the output voltage of the circuit arrangement illustrated in FIG. 1 assumes a lower limit higher than 3 V, and hence such a circuit arrangement is not useful in the case where it is specified that the required output voltage is equal to or lower than 3 V. Among commercially available constant-voltage Zener diodes, though rarely, are ones representing a Zener voltage of about 2 V; however, such a Zener diode is disadvantageous in that the temperature-dependence of its performance (Zener voltage) is so high that it cannot be positively employed for the intended purpose of achieving stabilized output voltage.

Secondly, high efficiency will be considered. In the circuit arrangement of FIG. 1, the resistor R1 is required permit base current to flow through the first switching transistor Q1 when the latter is turned on. However, when the first switching transistor is turned off, an unwanted current, which has passed through the main current passage of the second switching transistor Q2, is permitted to flow through the resistor R1 so that power loss occurs at the resistor R1, which causes the efficiency of the power supply device to be deteriorated.

It is well known in the art to use MOS FET instead of bipolar transistor with a view to increasing the efficiency of the power supply device. However, if the first switching transistor Q1 is simply changed from bipolar transistor to MOS FET, then it may happen that the power supply device is inoperable for the specification thereof.

This is due to the fact that the driving voltage of bipolar transistor is as low as about 0.7 V, while that of MOS FET is as high as about 3 V. That is, if MOS FET is used as the first switching transistor Q1 in the circuit arrangement of FIG. 1, then it may happen, depending on input voltage and/or resistance ratio of the resistor R3 to the resistor R1, that gate-source voltage of the first switching transistor Q1 cannot be made to be higher than the driving voltage (3 V) of MOS FET. For a case where MOS FET is used as the first switching transistor Q1 and the circuit arrangement of FIG. 1 is rendered operative, a verification based on experiments conducted with respect to a circuit arrangement of a certain specification has shown that the magnitude of input voltage for making it possible to achieve positive operation is higher than about 8 V, thus resulting in extremely low versatility.

SUMMARY OF THE INVENTION

Accordingly, the present invention intends to achieve the blow-mentioned objects.

A first object is to enhance the versatility of a self-excited oscillation type power supply device by expanding the range for lower limit of output voltage derived therefrom.

A second object is to increase the efficiency of a self-excited oscillation type power supply device by decreasing wasteful power loss which tends to be caused in the circuit arrangement of the power supply device.

A third object is to enhancing the efficiency of a self-excited oscillation type power supply device by making it possible to use MOS FET as a switching element without deteriorating the versatility of the power supply device.

To achieve the foregoing objects, according to the present invention, in a self-excited oscillation type switching power supply device comprising a first and a second switching transistor which operate in complementary relationship with each other wherein a current flowing through an inductance component connected in series with the first switching transistor is turned on and off with the aid of the first switching transistor so that desired output voltage is derived from voltage occurring in a given winding of the inductance component; an auxiliary transistor is provided between the connection point between the base of the first switching transistor and the collector of the second switching transistor, and a reference potential point, and the circuit arrangement is made such that in addition to forward bias signal as applied when the device is started, at least one of voltage signal derived from alternating voltage produced in the inductance component and voltage signal corresponding to the output voltage is applied to the auxiliary transistor.

More specifically, the circuit arrangement is selectively made such that a bias circuit is connected between the base of the auxiliary transistor and input terminal, and constant-voltage generating means is connected between the base of the auxiliary transistor and output terminal; such that a bias circuit is connected between the base of the auxiliary transistor and the input terminal, and the base of the auxiliary transistor is connected to the connection point between the inductance component and the first switching transistor through a capacitance element; or such that the base of the auxiliary transistor is connected to the connection point between the inductance component and the first switching transistor through a capacitance element, and the base of the auxiliary transistor is further connected to the connection point between the gate of the first switching transistor and the collector of the second switching transistor through a starting circuit.

Other objects, features and advantages of the present invention will become apparent from the ensuing description taken in conjunction with the accompanying drawings.

DESCRIPTION OF THE PREFERRED EMBODIMENTS

Figure 2:
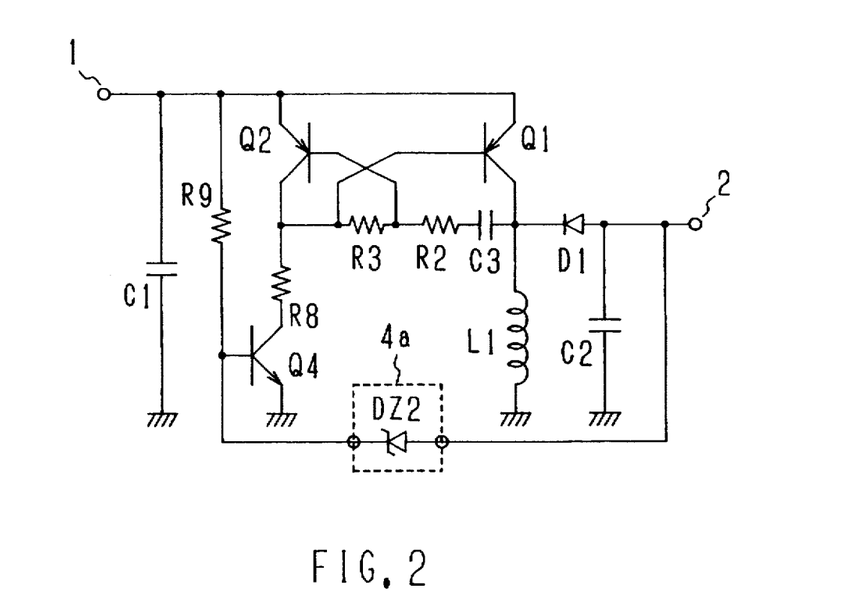
FIG. 2 is a circuit diagram showing the self-excited oscillation type power supply device according to a first embodiment of the present invention.

Referring to FIG. 2, there is illustrated the self-excited oscillation type switching power supply device according to a first embodiment of the present invention, which is arranged to effectively decrease the lower limit of output voltage. Circuit components of FIG. 2 which correspond to those of FIG. 1 are indicated by like reference symbols, and this also applies in the description of the other embodiments shown in FIGS. 2 through 8.

In the circuit arrangement of FIG. 2, a back-boost chopper converter is constituted by a first switching transistor Q1, choke coil L1, diode D1, and smoothing capacitor C2; and that portion of the circuit arrangement which comprises a second switching transistor Q2, capacitor C3, and resistors R2 and R3 which are connected together, is identical with that of the conventional self-excited oscillation type power supply device of FIG. 1.

As will be seen, the circuit arrangement of FIG. 2 is different from that of FIG. 1 in respect of the below-described circuit portions.

That is, an auxiliary transistor Q4 is provided the collector of which is connected to the connection point between the base of the first switching transistor Q1 and the collector of the second switching transistor Q2 through a current limiting resistor R8, with the emitter of the auxiliary transistor Q4 being connected to earth (low potential side reference potential point). A bias resistor R9 is connected between the base of the auxiliary transistor Q4 and input terminal 1 (high potential side reference potential point), and a constant-voltage generating means 4a is connected between the base of the auxiliary transistor Q4 and output terminal 2.

The constant-voltage generating means 4a comprises a constant-voltage diode DZ2 which has its cathode coupled to the base of the auxiliary transistor Q4 and its anode tied to the output terminal 2.

With the FIG. 2 circuit arrangement as constructed above, a forward bias voltage is applied to the base of the auxiliary transistor Q4 with the aid of resistor R9. While the circuit of FIG. 2 is being operated, output voltage occurring at the output terminal 2 is negative with respect to earth, and a voltage signal which is higher than the output voltage by a certain amount is inputted to the base of the auxiliary transistor Q4 with the aid of the constant-voltage generating means 4a. The "certain amount" corresponds to the Zener voltage of the constant-voltage diode DZ2. Assuming that the output voltage is varied, the voltage signal applied to the base of the auxiliary transistor Q4 is varied, and the collector current of the auxiliary transistor Q4 is varied with the output voltage. The base current of the first switching transistor Q1 when the latter is in on state, depends on the collector current of the auxiliary transistor Q4, and thus the on duty of the first switching transistor Q1 is varied with the output voltage, so that the output voltage is controlled to be constant.

Assuming now that the Zener voltage of the constant-voltage diode DZ2 and base-emitter voltage of the auxiliary transistor Q4 are $V_{Z2}$ and $V_{BE4}$, the set value for the output voltage of the circuit arrangement shown in FIG. 2 becomes equal to ($V_{Z2}-V_{BE4}$). As can be seen, the circuit of FIG. 2 provides output voltage which is lower than that of the circuit of FIG. 1 by the amount corresponding to the base-emitter voltage of the auxiliary transistor Q4. Further, the auxiliary transistor Q4 permits minimum necessary current to flow therethrough in accordance with the then obtainable output voltage, thereby decreasing the current which flows from the second switching transistor Q2 to resistor R8 when the second switching transistor Q2 is in on state. As a consequence, power loss occurring at the resistor R8 in the circuit of FIG. 2 turns out to be lower than that occurring at the resistor R1 in the circuit of FIG. 1; thus, advantageously, higher efficiency of the power supply device can be achieved.

Figure 3:
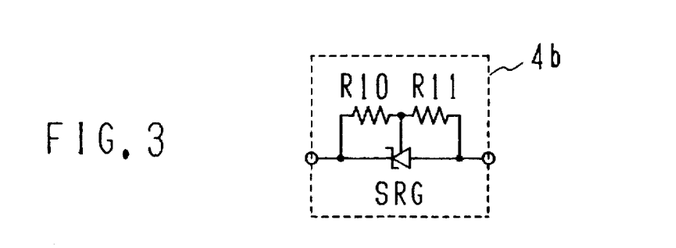
FIG. 3 is a circuit diagram showing another form of constant-voltage generating means.
Figure 4:
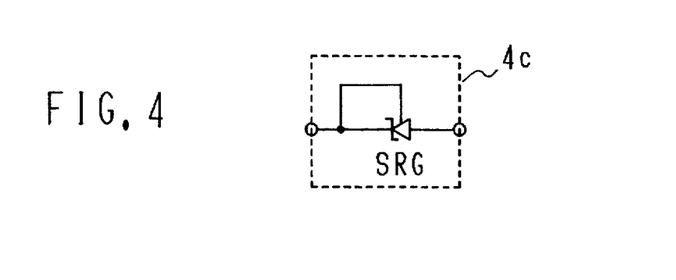
FIG. 4 is a circuit diagram showing a still another form of constant-voltage generating means.

While in the circuit of FIG. 2, the constant-voltage generating means 4a comprising the constant-voltage diode DZ2 is used, it is also possible that such constant-voltage generating means 4b or 4c as shown in FIG. 3 or 4 may be employed in lieu of the constant-voltage generating means 4a of FIG. 2.

The constant-voltage generating means shown in FIG. 3 comprises a shunt regulator SRG having its cathode located at the auxiliary transistor Q4 side and its anode positioned at the output terminal 2 side, and resistors R10 and R11 which are connected between the cathode and the reference and between the anode and the reference respectively. When the constant-voltage generating means 4b is incorporated in the circuit of FIG. 2, a voltage which is higher than the output voltage by the amount corresponding to voltage occurring between the cathode and the anode of the shunt regulator SRG is applied to the base of the auxiliary transistor Q4. With this constant-voltage generating means, the voltage occurring between the cathode and the anode of the shunt regulator SRG can be changed by adjusting the resistance ratio of the resistor R10 to the resistor R11; thus, it is possible construct such a power supply device that the output voltage is variable.

The constant voltage generating means 4c of FIG. 4 is constituted by shunt regulator SRG which is shunted between the cathode and the reference. With such arrangement, voltage that occurs between the cathode and the anode of the shunt regulator SRG is equal to reference voltage of a reference voltage source contained in the shunt regulator SRG. With power supply device using the constant voltage generating means 4c shown in FIG. 4, the output voltage is stabilized with respect to changes in the ambient temperature by virtue of the fact that the reference voltage of the shunt regulator SRG represents low temperature-dependence. Furthermore, since the reference voltage of the shunt regulator SRG is normally 2.5 V or 1.25 V, output voltage of low magnitude can readily be obtained.

Figure 5:
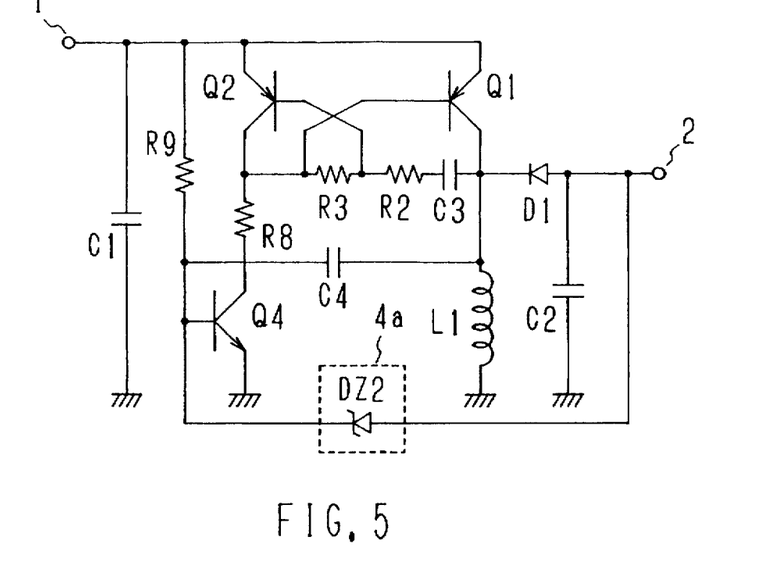
FIG. 5 is a circuit diagram illustrating the self-excited oscillation type switching power supply device according to a second embodiment of the present invention.

Referring to FIG. 5, there is shown the self-excited oscillation type switching power supply device according to a second embodiment of the present invention. As will be seen, the circuit shown in FIG. 5 is arranged such that a capacitor C4 is connected between the connection point between the first switching transistor Q1 and the choke coil L1 and the base of the auxiliary transistor Q4 in the circuit of FIG. 2.

With such circuit arrangement of FIG. 5, voltage signal derived from alternate voltage (alternately occurring induced voltage and flyback voltage) occurring at the choke coil L1 is applied to the base of the auxiliary transistor Q4. When the first switching transistor Q1 is in off state, flyback voltage is generated at the choke coil L1 and provides a reverse bias between the base and the emitter of the auxiliary transistor Q4 through the capacitor C4. Thereupon, the auxiliary transistor Q4 is turned on, so that current flowing from the second switching transistor Q2 to the resistor R8 is interrupted. As a result, power loss occurring at the resistor R8 is decreased so that the efficiency of the power supply device is enhanced The combination of the capacitor C4 and auxiliary transistor Q4 in the circuit of FIG. 5 is also applicable to any other similar self-excited oscillation type switching power supply device. As an example of such application, the self-excited oscillation type power supply device according to a third embodiment of the present invention is shown in FIG. 6.

Figure 6:
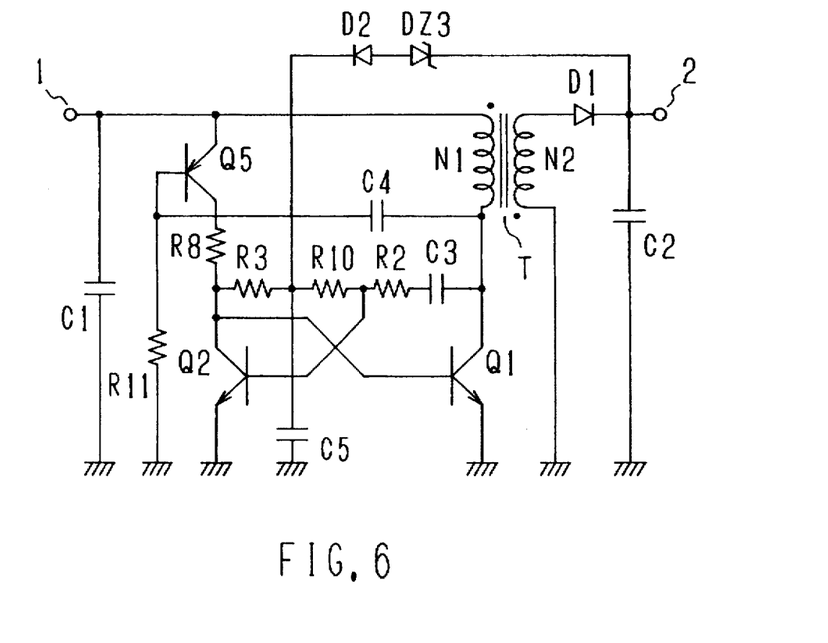
FIG. 6 is a circuit diagram illustrating the self-excited oscillation type switching power supply device according to a third embodiment of the present invention.

In FIG. 6, an ordinary converter circuit is constituted by a primary winding of a transformer connected in series between input terminal 1 and ground, and first switching transistor; a secondary winding connected in series between output terminal 2 and ground, and diode D1; and a smoothing capacitor C2 connected between the output terminal 2 and ground.

For self-excited oscillation of the power supply device, second switching transistor Q2 is provided; a capacitor C3, resistor R2, resistor R10, and resistor R3 are connected between the collectors of the first and second switching transistors Q1 and Q2; the respective bases of the first and second switching transistors Q1 and Q2 are coupled to the collector of the second switching transistor Q2 and one end of the resistor R10. Further, for constant voltage control, a constant-voltage diode DZ3 and diode D2 are connected between the output terminal 2 and the other end of the resistor R10; and a capacitor C5 is connected between the other end of the resistor R10 and ground for the purpose of preventing erroneous operation due to noise.

In the circuit of FIG. 6, resistor R8 and auxiliary transistor Q5 are connected in series between the collector of the second switching transistor Q2 and the input terminal 1; bias resistor R11 is connected between the base of the auxiliary transistor Q5 and ground; and capacitor C4 is connected between the base of the auxiliary transistor Q5 and the collector of the first switching transistor Q1. The auxiliary transistor Q5 of FIG. 6 is slightly different from the auxiliary transistor Q4 of FIG. 5 in that it makes no contribution to controlling the output voltage of the power supply device. In this case, when the power supply device is started, the auxiliary transistor Q5 is rendered conductive with a forward bias applied thereto through resistor R11 and cause the first switching transistor Q1 to be switched to on state; and during operation of the power supply device, when the second switching transistor Q2 is turned on with an alternate voltage which occurs at the primary winding N1 of the transformer T, the auxiliary transistor Q5 is turned off, thus making contribution to enhancing the efficiency of the power supply device.

Figure 7:
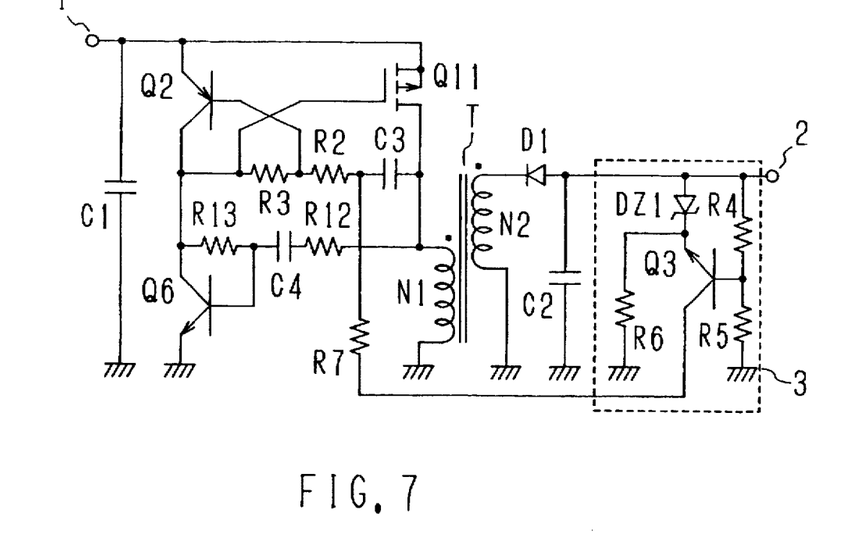
FIG. 7 is a circuit diagram illustrating the self-excited oscillation type switching power supply device according to a fourth embodiment of the present invention.

Referring to FIG. 7, there is shown the self-excited oscillation type switching power supply device according to a fourth embodiment of the present invention, which is designed so that MOS FET can be used as first switching transistor Q11.

The circuit arrangement shown FIG. 7 is characterized in that an auxiliary transistor Q6 is connected between the collector of a second switching transistor Q2 and ground; a starting resistor R13 is connected between the collector and the base of the auxiliary transistor Q6; and a series circuit of a capacitor C4 and resistor R12 is connected between the base of the auxiliary transistor Q6 and the drain of the first switching transistor Q11. The basic portion of the circuit arrangement sown in FIG. 7 is substantially identical with the conventional circuit arrangement of FIG. 1 except that in the conventional circuit of FIG. 1, the first switching transistor Q1 is substituted with the first switching transistor Q11 comprising MOS FET, and the choke coil L1 is replaced with the transformer T.

In the circuit arrangement shown in FIG. 7, when it is started, a current path is first established which comprises, in the named order, the emitter and base terminals of the second switching transistor Q2, resistor R3, starting resistor R13 and the base and emitter terminals of the auxiliary transistor Q6. Thereupoun, a forward bias is applied to the auxiliary transistor Q6 through the starting resistor R13 the auxiliary transistor Q6 is rendered conductive. Because of the auxiliary transistor Q6 being rendered conductive, the gate potential of the first switching transistor Q11 is decreased, so that such a condition is established that driving of the first switching transistor Q11 is possible even when the input voltage is as low as about 5 V, for example. In practice, by using for the auxiliary transistor Q6 a component having a higher current amplification factor than that of the second switching transistor Q2 in the manufacture of the power supply device, it is possible to achieve such an arrangement that driving of the power supply device can positively effected.

During operation of the power supply device, alternate voltage that occurs at the primary winding N1 of the transformer T is applied to the base of the auxiliary transistor Q6 through the capacitor C4. Thereupon, the auxiliary transistor Q6 is turned on in response to flyback voltage generated at the primary winding N1 of the transformer T to cause the gate potential of the first switching transistor Q11 to be decreased, thus making contribution to permitting the first switching transistor Q11 to be positively switched to on state. Furthermore, the auxiliary transistor Q6 is turned off when the second switching transistor Q2 is turned on as in the circuits of FIGS. 5 and 6, thereby restraining occurrence of loss at the resistor R1 shown in FIG. 1, which is caused by current flow through the main current passage of the second switching transistor Q2.

With the circuit arrangement of FIG. 7, as discussed above, the auxiliary transistor Q6 permits of use of MOS FET for the first switching transistor Q11, while at the same time restraining occurrence of loss which tends to be caused by a current passing through the second switching transistor Q2. In this way, the the power supply device represents enhanced efficiency.

Figure 8:
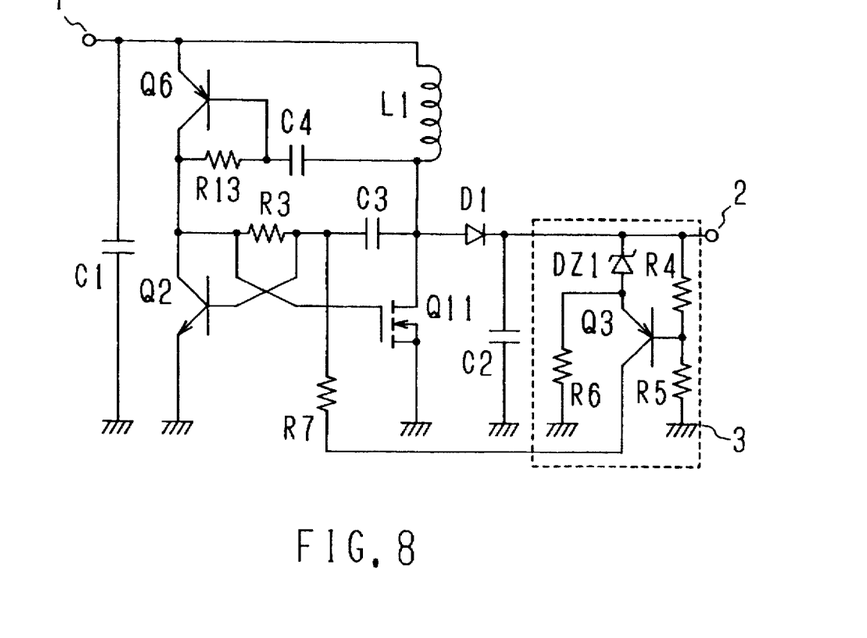
FIG. 8 is a circuit diagram illustrating the self-excited oscillation type switching power supply device according to a fifth embodiment of the present invention.

Referring to FIG. 8, there is shown the self-excited oscillation type power supply device according to a fifth embodiment of the present invention. With the circuit arrangement of FIG. 8, high efficiency is realized by employing MOS FET for the first switching transistor Q11 as is the case with the circuit arrangement of FIG. 7.

In the circuit arrangement shown in FIG. 8, a step-up chopper converter is constituted by a choke coil L1, first switching transistor Q11, diode D1, and smoothing capacitor C2; and the circuit portion including the the second switching transistor Q2 for self-excited oscillation and the circuit portion including the auxiliary transistor Q6 for driving MOS FET are arranged to be in opposite polarity to those of FIG. 7. The circuit arrangement of FIG. 8 is intended to be applied to a power supply device having lower capacitance than in the case of the circuit arrangement shown in FIG. 7; thus, the resistor R2 and resistor R12 for current control are omitted.

As will be appreciated, such circuit arrangement of FIG. 8 is substantially identical with that of FIG. 7 in terms the basic operation thereof and the operation of the respective circuit portions. Therefore, further detailed description will be omitted.

While the present invention has been illustrated and described with respect to specific embodiments thereof, it is to be understood that the present invention is by no means limited thereto but encompasses all changes and modifications which will become possible within the scope of the appended claims.

The entire disclosures of Japanese Patent Application Nos. 8-160545, 8-175734, and 8-263797 filed May 31, 1996, Jun. 14, 1996 and Sep. 13, 1996, respectively, each including specification, claims, drawings and summary are incorporated herein by reference in their entirety.

I claim:

1. A self-excited oscillation type power supply device including a first and a second switching transistor connected to operate in complementary relationship to each other, wherein current flowing through an inductance component connected in series with said first switching transistor is turned on and off with the aid of said first switching transistor, and desired output voltage is derived from voltage which occurs at a given winding of said inductance component, the improvement comprising:

an auxiliary transistor connected between connection point between base of said first switching transistor and collector of said second switching transistor and reference potential point, wherein in addition to forward bias signal as applied when the device is started, at least one of voltage signal derived from alternating voltage produced in the inductance component and voltage signal corresponding to the output voltage is applied to the auxiliary transistor.

2. A back-boost type/self-excited oscillation type switching power supply device including a first and a second switching transistor connected to operate in complementary relationship to each other, wherein current flowing through an inductance component connected in series with said first switching transistor is turned on and off with the aid of said first switching transistor, and voltage which occurs at a winding of said inductance component is rectified and smoothed to thereby obtain output voltage which is opposite in polarity to input voltage, the improvement comprising:

an auxiliary transistor having a main current passage connected between connection point between base of said first switching transistor and collector of said second switching transistor and reference potential point;

a bias circuit connected between the base of said auxiliary transistor and input terminal; and constant-voltage generating means connected between the base of said auxiliary transistor and output terminal.

3. An insulated type switching power supply device according to claim 2, wherein said constant-voltage means comprises a shunt regulator having a cathode terminal connected to the base of said auxiliary transistor and an anode terminal connected to said output terminal, a first resistor connected between the cathode terminal and a reference terminal of said shunt regulator, and a second resistor connected between the anode terminal and the reference terminal of said shunt regulator.

4. An insulated type power supply device according to claim 2, wherein said constant-voltage generating means comprises a shunt regulator having a cathode terminal connected to the base of said auxiliary transistor and an anode terminal coupled to said output terminal, with said cathode terminal and reference terminal being short-circuited.

5. A self-excited oscillation type power supply device including a first and a second switching transistor connected to operate in complementary relationship to each other, wherein current flowing through an inductance component connected in series with said first switching transistor is turned on and off with the aid of said first switching transistor, and desired output voltage is derived from voltage which occurs at a given winding of said inductance component, the improvement comprising:

a series circuit of an impedance element and auxiliary transistor, said series circuit being connected between connection point between base of said first switching transistor and collector of said second switching transistor and reference potential point;

a bias circuit connected between base of said auxiliary transistor and input terminal; and a capacitance element connected between the connection point between said first switching transistor and said inductance component and the base of said auxiliary transistor.

6. An insulated type power supply device according to claim 5, wherein said impedance element is a resistance element.

7. A self-excited oscillation type power supply device including a first and a second switching transistor connected to operate in complementary relationship to each other, wherein current flowing through an inductance component connected in series with said first switching transistor is turned on and off with the aid of said first switching transistor, and desired output voltage is derived from voltage which occurs at a given winding of said inductance component, the improvement comprising:

said first switching transistor comprising a field effect transistor;

an auxiliary transistor having a main current passage connected between connection point between gate of said first switching transistor and collector of said second switching transistor and reference potential point;

a starting circuit connected between the connection point between the gate of said first switching transistor and the collector of said second switching transistor and base of said auxiliary transistor; and a capacitance element connected between the connection point between said first switching transistor and said inductance component and the base of said auxiliary transistor.

* * * * *

UNITED STATES PATENT AND TRADEMARK OFFICE
CERTIFICATE OF CORRECTION

PATENT NO. : 5,796,241
DATED : August 18, 1998
INVENTOR(S) : Tetushi Otake

It is certified that an error appears in the above-identified patent and that said Letters Patent is hereby corrected as shown below:

On the title page item [30] should read as follows:

[30] Foreign Application Priority Data
May 31, 1996 [JP] Japan ..................... 160545/1996
Jun 14, 1996 [JP] Japan ..................... 175734/1996
Sep 13, 1996 [JP] Japan ..................... 263797/1996

Signed and Sealed this

Eighth Day of December, 1998

BRUCE LEHMAN

*Attest:*

*Attesting Officer*  Commissioner of Patents and Trademarks